United States Patent
Jing

(10) Patent No.: US 6,259,835 B1
(45) Date of Patent: Jul. 10, 2001

(54) MECHANICALLY ACTUATED OPTICAL SWITCH

(75) Inventor: Xingliang Jing, Fremont, CA (US)

(73) Assignee: Primawave Photonics, Inc., Fremont, CA (US)

( * ) Notice: Subject to any disclaimer, the term of this patent is extended or adjusted under 35 U.S.C. 154(b) by 0 days.

(21) Appl. No.: 09/416,838

(22) Filed: Oct. 12, 1999

(51) Int. Cl.[7] .................................................. G02B 6/26
(52) U.S. Cl. .............................. 385/18; 385/16; 385/17; 385/33; 385/36
(58) Field of Search .................................. 385/16–18, 22, 385/24, 33–37

(56) References Cited

U.S. PATENT DOCUMENTS

| | | | |
|---|---|---|---|
| 4,834,488 | 5/1989 | Lee | 350/96.2 |
| 5,420,946 | 5/1995 | Tsai | 385/22 |
| 5,436,986 | 7/1995 | Tsai | 385/16 |
| 5,438,449 | 8/1995 | Chabot et al. | 359/216 |
| 5,479,541 | 12/1995 | Pan | 385/22 |
| 5,594,820 | 1/1997 | Garel-Jones et al. | 385/22 |
| 5,611,009 | 3/1997 | Pan | 385/22 |
| 5,642,446 | 6/1997 | Tsai | 385/16 |
| 5,742,712 | 4/1998 | Pan et al. | 385/18 |
| 5,815,614 | 9/1998 | Pan | 385/22 |
| 5,828,800 | 10/1998 | Henry et al. | 385/20 |
| 5,838,847 | 11/1998 | Pan et al. | 385/18 |
| 5,867,617 | 2/1999 | Pan et al. | 385/18 |
| 5,920,665 | 7/1999 | Presby | 385/16 |
| 5,923,798 | 7/1999 | Aksyuk et al. | 385/19 |
| 6,031,946 | * 2/2000 | Bergmann et al. | 385/18 |
| 6,091,867 | * 7/2000 | Young et al. | 385/18 X |

* cited by examiner

*Primary Examiner*—Phan T. H. Palmer
(74) *Attorney, Agent, or Firm*—Brobeck, Phleger & Harrison LLP

(57) ABSTRACT

A 1×N mechanically actuated optical switch includes a plurality of optical reflectors, at least some of which are movable between their on and off positions to switch an input optical signal to any one of a plurality of output optical fibers selected for outputting the optical signal.

66 Claims, 5 Drawing Sheets

US 6,259,835 B1

MECHANICALLY ACTUATED OPTICAL SWITCH

BACKGROUND OF THE INVENTION

1. Field of the Invention

The present invention relates to optical switches, and more particularly, to mechanically actuated optical switches.

2. Background

Optical switches have been developed for switching optical networks in broadband telecommunications systems. Because of increasing demand for high speed broadband data communications, optical wavebands including infrared and visible light wavelengths are increasingly being used as data carriers in telecommunications systems to satisfy the demand for high speed broadband data transmission. Conventional optical switches have been implemented in a typical optical fiber telecommunications network to switch the optical paths of information-carrying light to different optical fiber cables.

Conventional optical switches typically fall into two broad categories of non-integrated optical switches and integrated optical switches. Among the non-integrated optical switches, moving fibers have been used to change optical paths between different input or output fibers. In a conventional moving fiber switch, either the input optical fibers or the output optical fibers are moved mechanically to switch the optical path between different input or output optical fibers.

However, conventional moving fiber switches typically suffer from alignment problems because it is difficult to align the input and output fibers with a high degree of accuracy and repeatability. Alignment of single mode fibers can be especially difficult because of their small diameters. Even a slight misalignment between the selected input and output fibers through which optical transmission supposedly occurs may result in an unacceptably high insertion loss because the output fiber is not in the perfect position on the optical path to receive the light transmitted from the input fiber.

In order to avoid the problem of misalignment in a typical fiber moving switch, expensive and complicated mechanisms are usually required to move either the input or the output optical fibers to achieve acceptable alignment accuracy and repeatability. Furthermore, conventional moving fiber switches typically have slow switching speeds which may limit their applications in optical fiber communications networks which require high-speed switching operations.

Moving reflectors have also been used in conventional non-integrated optical switches to switch optical paths between different input or output optical fibers instead of moving the input or output fibers for optical alignment. Moving reflector switches are usually capable of faster switching operations than conventional moving fiber switches. However, conventional reflector switches typically also suffer from the problems of mechanical stability and repeatability. After a large number of repeated on and off switching operations, the optical reflectors in a conventional reflector switch may deviate from their designed reflection angles because of the problems with mechanical stability and repeatability. Even a slight deviation of reflection angle may cause the optical path of reflected light to be misaligned with a respective output fiber or another reflector which is supposedly positioned to receive the reflected light.

Therefore, there is a need for an optical switch with a high degree of reliability after a large number of repeated on and off switching operations which are typically required in modern optical fiber telecommunications networks. Furthermore, there is a need for an optical switch which provides accurate optical alignments between the reflectors and the optical fibers without requiring expensive or delicate mechanical assemblies for switching the reflectors between their on and off positions.

SUMMARY OF THE INVENTION

The present invention provides a mechanically actuated optical switch, roughly comprising a primary optical port, a plurality of secondary optical ports, a support plate having first and second surfaces opposite each other, a plurality of movable optical reflectors each capable of occupying an on position to reflect light from the primary optical port to a respective one of the secondary optical ports, and a plurality of actuators connected to the movable optical reflectors respectively to drive the optical reflectors between their on and off positions.

In an embodiment, light is transmitted from the primary or input optical port to the selected secondary or output optical port by using a single optical reflector to reflect the light on a first optical path from the primary optical port onto a second optical path leading to the selected secondary optical port. In another embodiment in which input and output optical fibers connected to the optical switch assembly are desired to be parallel to each other, a fixed primary reflector is provided on the support plate to reflect incoming light on the first optical path from the primary optical port onto a second optical path, and the movable secondary reflectors are positioned along the second optical path. When one of the secondary reflectors is selected to be switched to its on position while other secondary reflectors are in their off positions, light on the second optical path is reflected by the selected secondary reflector onto a third optical path leading to the respective secondary optical port for outputting the light.

In an embodiment, the on positions of the movable optical reflectors are above the first surface of the support plate whereas the actuators are positioned below the second surface of the support plate. In a further embodiment, the support plate is provided with apertures, and the actuators are connected to the movable optical reflectors respectively through a plurality of levers which are movably positioned through the apertures in the support plate to drive the respective movable optical reflectors.

A movable optical reflector is switched to its on position when it is moved by the lever away from the first surface of the support plate to a predetermined position above the first surface of the support plate to intercept light on an incident optical path. The movable optical reflector has a reflection surface angled with respect to the incident optical path when the movable optical reflector is in its on position to reflect the light onto a reflected optical path which eventually leads to one of the output optical fibers. When the movable optical reflector is switched from its on position to its of f position, it is moved by the lever away from the incident optical path toward the first surface of the support plate. In a further embodiment, the off position of the movable optical reflector is within the aperture in the support plate.

In an embodiment, the actuators comprise relay switches capable of generating repetitive movements in opposite directions. Either prisms or mirrors may be used as optical reflectors in the optical switch according to the present invention, although other types of optical reflectors may also be used. For each of the optical reflectors, the reflection surface may be angled at 45° with respect to its incident optical path to reflect the light onto a reflected optical path which is perpendicular to the incident optical path, although other reflection angles may also be used within the scope of the present invention.

In an embodiment, a plurality of lenses are provided adjacent terminations of the input and output optical fibers to collimate light on the respective optical paths. In a further embodiment, the lenses and end portions of the respective optical fibers are housed in a plurality of collimator assemblies which are fixedly connected to the first surface of the support plate. In yet a further embodiment, the collimator assemblies are connected to the first surface of the support plate by laser welding for improved mechanical stability and reliability.

Advantageously, the mechanically actuated optical switch according to the present invention can be implemented in an optical fiber telecommunications network which requires a large number of frequent switching operations with a high degree of mechanical reliability and repeatability for accurate optical alignments. Furthermore, optical switching can be achieved with a high degree of reliability without requiring expensive or delicate mechanisms for actuating the movable optical reflectors in the optical switch according to the present invention.

BRIEF DESCRIPTION OF THE DRAWINGS

The invention will be described with respect to particular embodiments thereof, and references will be made to the drawings in which.

DETAILED DESCRIPTION

Figure 1:
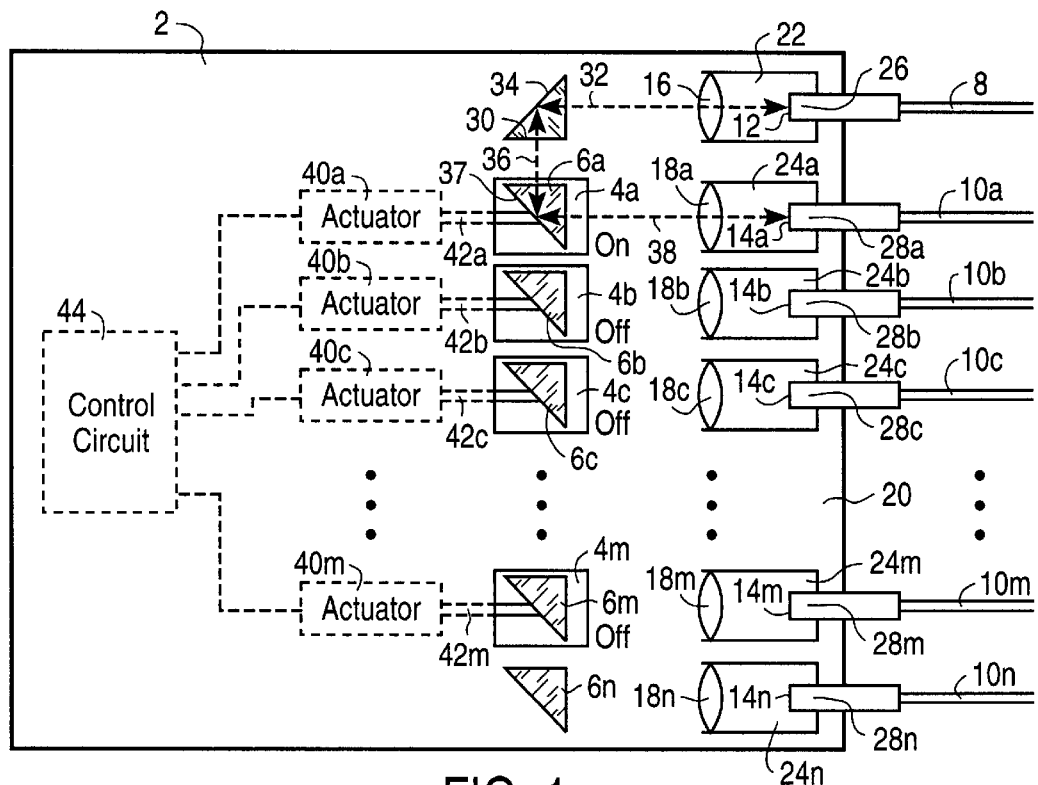
FIG. 1 shows a top plan view of an embodiment of a mechanically actuated optical switch according to the present invention.

FIG. 1 shows a top plan view of an embodiment of a mechanically actuated optical switch according to the present invention. A support plate 2 is provided with a plurality of apertures 4a, 4b, 4c, . . . 4m to allow mechanical movements of optical reflectors 6a, 6b, 6c, . . . 6m, respectively, when they are switched between their on and off positions. Two or more optical reflectors may share a single aperture in a different embodiment. In another embodiment, all of the movable optical reflectors 6a, 6b, 6c, . . . 6m may share a single elongated aperture instead of the apertures as shown in FIG. 1. In an embodiment, the movements of the optical reflectors 6a, 6b, 6c, . . . 6m are roughly perpendicular to the support plate 2.

In the embodiment shown in FIG. 1, an input optical fiber 8 and a plurality of output optical fibers 10a, 10b, 10c, . . . 10m and 10n are positioned to provide input and output optical paths to the switch through a primary optical port 12 and a plurality of secondary optical ports 14a, 14b, 14c, . . . 14m and 14n, respectively. A plurality of collimator lenses including a primary lense 16 and a plurality of secondary lenses 18a, 18b, 18c, . . . 18m and 18n are provided on the respective optical paths adjacent the primary optical port 12 and the secondary optical ports 14a, 14b, 14c, . . . 14m and 14n, respectively.

In a further embodiment, a plurality of collimator assemblies are provided on a first surface which is the top surface 20 of the support plate 2. In the embodiment shown in FIG. 1, a first collimator assembly 22 is positioned on the first surface 20 of the support plate 2 to house the primary len 16. A plurality of additional collimator assemblies 24a, 24b, 24c, . . . 24m and 24n are positioned on the first surface 20 of the support plate 2 to house the secondary lenses 18a, 18b, 18c, . . . 18m and 18n, respectively. The input optical fiber 8 and the output optical fibers 10a, 10b, 10c. . . 10m and 10n have terminations forming the primary optical port 12 and secondary optical ports 14a, 14b, 14c, . . . 14m and 14n, respectively.

In the embodiment shown in FIG. 1, the first collimator assembly 22 houses an end portion 26 of the input optical fiber 8 adjacent its termination as well as the primary lens 16. Furthermore, the additional collimator assemblies 24a, 24b, 24c, . . . 24m and 24n house the end portions 28a, 28b, 28c, . . . 28m and 28n of the output optical fibers 10a, 10b, 10c, . . . 10m and 10n adjacent their terminations in addition to the secondary lenses 18a, 18b, 18c, . . . 18m and 18n, respectively. In a further embodiment, the collimator assemblies 22 and 24a, 24b, 24c, . . . 24n are fixedly connected to the first surface 20 of the support plate 2 by laser welding to ensure that they are positioned at desired locations on the first surface 20 of the support plate 2 with a high degree of mechanical stability. Stable optical paths can thus be established between the collimator assemblies and their respective optical reflectors.

In the embodiment shown in FIG. 1, a primary optical reflector 30 is positioned on the first surface 20 of the support plate 2 to receive incoming light on a first optical path 32 from the primary optical port 12. The primary reflector 30, which comprises a prism as shown in FIG. 1, has a reflection surface 34 which is angled at 45° with respect to the first optical path 32. The light reflected from the primary reflector 30 travels along a second optical path 36 before it reaches one of the movable optical reflectors, such as the first movable optical reflector 6a as shown in FIG. 1, which is in its on position to intercept the light on the second optical path 36.

The movable optical reflector 6a, which is shown as a prism in FIG. 1, has a reflection surface 37 which is angled at 45° with respect to the second optical path 36 to reflect the light onto a third optical path 38. Light on the third optical path 38 is transmitted through the collimator lens 18a in the collimator assembly 24a to the respective secondary optical port 14a which leads to the output optical fiber 10a. Because light transmission has the property of reciprocity, incoming light can also be transmitted from the optical fiber 10a through the collimator lens 18a to the secondary reflector 6a when it is in the on position to reflect the light onto the second optical path 36. The light is then reflected by the primary reflector 30 to the primary optical port 12 through the collimator lens 16. The collimator lenses are positioned to collimate light travelling between the respective optical ports and the optical reflectors because light transmitted from an optical fiber termination tends to disperse as it travels into free space beyond the termination.

When the optical reflector 6a is in its on position as shown in FIG. 1, light transmitted from the input optical fiber 8 is output to the output optical fiber 10a, regardless of whether other movable optical reflectors 6b, 6c, . . . 6m are in their on or off positions. If the movable optical reflector 6a is in its off position while the movable optical reflector 6b is in its on position, for example, the light transmitted from the input optical fiber 8 is switched to the output optical fiber 10b, regardless of whether subsequent movable optical reflectors 4c . . . 4m are in their on or off positions.

The last optical reflector 6n, which is fixedly positioned on the first surface 20 of the support plate 2 in the embodiment shown in FIG. 1, reflects the input light reflected from the fixed primary optical reflector 30 to the output optical fiber 10n only if all of the movable optical reflectors 6a, 6b, 6c, . . . 6m are in their off positions. The output optical port 14n is thus the default optical output when all of the movable optical reflectors are switched off. In an alternate embodiment, the last optical reflector 6n comprises a movable optical reflector identical to the movable optical reflectors 6a, 6b, . . . 6m.

In FIG. 1, all of the secondary optical reflectors including optical reflectors 6a, 6b, 6c, . . . 6m and 6n as well as the primary optical reflector 30 are shown as prisms. Because the collimator assemblies are positioned above the first surface 20 of the support plate 2 in the embodiment shown in FIG. 1, all of the optical paths are above the first surface 20 of the support plate 2. Any one of the movable optical reflectors 6a, 6b, 6c, . . . 6m can be switched on when it is in a position to intercept the second optical path 36 above the first surface 20 of the support plate 2. Furthermore, each of the movable optical reflectors 6a, 6b, 6c, . . . 6m can be switched to its off position by moving the optical reflector away from the second optical path 36 toward the first surface 20 of the support plate 2. In an embodiment, each of the movable optical reflectors can be switched to its off position by moving into the respective aperture in the support plate 2.

The switching operations of the movable optical reflectors 6a, 6b, 6c, . . . 6m are achieved by a plurality of actuators 40a, 40b, 40c, . . . 40m which are capable of moving the optical reflectors 6a, 6b, 6c, . . . 6m respectively between their on and off positions. In an embodiment, the actuators 40a, 40b, 40c, . . . 40m are connected to the movable optical reflectors 6a, 6b, 6c, . . . 6m through a plurality of levers 42a, 42b, 42c, . . . 42m, respectively, to transfer mechanical movements generated by the actuators to the movable optical reflectors. In an embodiment, the actuators 40a, 40b, 40c, . . . 40m and the respective levers 42a, 42b, 42c, 42m are located below a second surface (not shown in the top plan view of FIG. 1) which is opposite the top surface 20 of the support plate 2. Embodiments of actuator assemblies for switching the movable optical reflectors 6a, 6b, 6c, . . . 6m will be described below in reference to the sectional views of FIGS. 6 and 7.

In an embodiment, the actuators 40a, 40b, 40c, . . . 40m are controlled by a control circuit 44 which supplies control voltages to the actuators to switch the movable optical reflectors 6a, 6b, 6c, . . . 6m between their on and off positions. In an embodiment, the actuators 40a, 40b, 40c, . . . 40m comprise conventional solenoid relay switches which are known to a person skilled in the art. The control circuit 44 may be designed to supply control voltages to the solenoid relay switches in a conventional manner which is apparent to a person skilled in the art.

In an embodiment, only one of the actuators is selected at a time to drive a respective one of the movable optical reflectors 6a, 6b, 6c, . . . 6m to its on position to reflect the light from the second optical path 36 onto a respective third optical path leading to the respective output optical port. Alternatively, the actuators may be controlled in such a manner that only the movable optical reflectors ahead of the selected movable optical reflector are switched to their off positions to allow the light on the second optical path 36 to reach the selected movable optical reflector, which is in its on position. For example, if the movable optical reflector 6c is selected for reflecting the light from the primary reflector 30 to the output optical port 14c, only the movable optical reflectors 6a and 6b ahead of the selected optical reflector 6c along the second optical path 36 need be switched off, even if some or all of the subsequent movable optical reflectors including the movable optical reflector 6m are in their on positions.

As described above, the last optical reflector 6n is the default reflector for switching the incoming light from the input optical fiber 8 to the last output optical fiber 10n when all of the movable optical reflectors 6a, 6b, 6c, . . . 6m are switched to their off positions. Although the first and last optical reflectors 30 and 6n are shown as fixed reflectors on the first surface 20 of the support plate 2, these reflectors may also be movable optical reflectors in a different embodiment, with switching movements between their on and off positions controlled by additional actuators. Various reflector arrangements can be made which are within the scope of the present invention.

Figure 2:
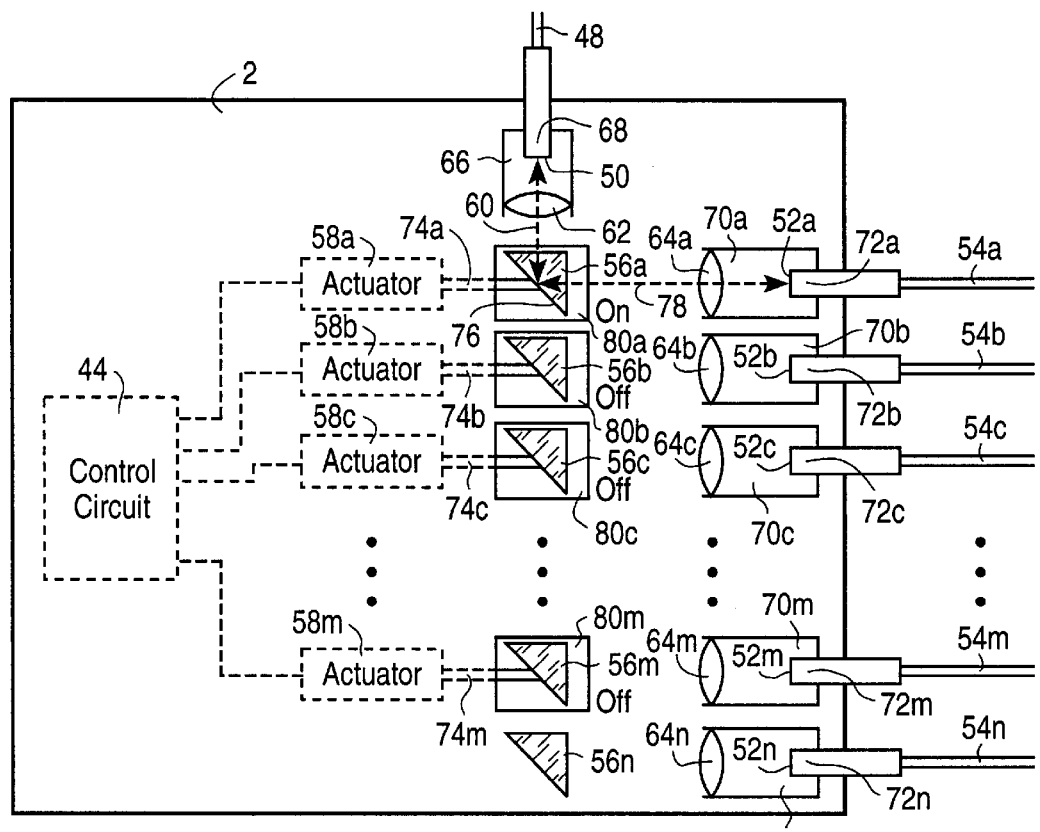
FIG. 2 shows a top plan view of another embodiment of the optical switch according to the present invention.

FIG. 2 shows a top plan view of another embodiment of the mechanically actuated optical switch according to the present invention, with an input optical fiber 48 leading to a primary or input optical port 50 and positioned perpendicular to a plurality of output optical fibers 54a, 54b, 54c, . . . 54m and 54n leading to secondary or output optical ports 52a, 52b, 52c, . . . 52m and 52n, respectively. Compared to the embodiment shown in FIG. 1, the light incoming from the input optical port 50 as shown in FIG. 2 is reflected by only one optical reflector before it travels to one of the output optical ports.

In the embodiment shown in FIG. 2, a plurality of movable optical reflectors 56a, 56b, 56c, . . . 56m are switchable between their on and off positions by a plurality of actuators 58a, 58b, 58c, . . . 58m. Each of the movable optical reflectors 56a, 56b, 56c, . . . 56m is positioned along a first optical path 60 leading from the input optical port 50. When a movable optical reflector is in its on position, it reflects the incoming light on the first optical path 60 to a respective one of the output optical ports 52a, 52b, 52c, . . . 52m. Furthermore, a fixed optical reflector 56n is positioned last along the first optical path 60 in the optical switch assembly and serves as the default reflector to reflect the incoming light to the last output optical port 52n only if all of the movable optical reflectors 56a, 56b, 56c, . . . 56m are in their off positions.

In the embodiment shown in FIG. 2, all of the optical reflectors 56a, 56b, 56c, . . . 56m and 56n comprise prisms with reflection angles set at 45° with respect to the first optical path 60. In this embodiment, the insertion loss for the optical switch may be reduced by about 0.1 dB to about 0.2 dB compared to the embodiment shown in FIG. 1 because only one prism instead of two is used to switch the light from the primary optical port to a selected secondary optical port in the embodiment shown in FIG. 2.

In an embodiment, a primary collimator lens 62 is provided adjacent the primary optical port 50 to collimate the light travelling along the first optical path 60. In a similar manner, a plurality of secondary collimator lenses 64a, 64b, 64c, . . . 64m and 64n are provided adjacent the secondary optical ports 52a, 52b, 52c, . . . 52m and 52n, respectively, to focus the light travelling along the respective optical paths from the optical reflectors to the secondary optical ports.

In a further embodiment, a first collimator assembly 66 is provided on the first surface 20 of the support plate 2 to house the primary collimator lens 62 as well as an end portion 68 of the input optical fiber 48 adjacent its termination. In a similar manner, a plurality of additional collimator assemblies 70a, 70b, 70c, . . . 70m and 70n are provided on the first surface 20 of the support plate 2 to house the secondary collimator lenses 64a, 64b, 6c, 64m and 64n as well as end portions 72a, 72b, 72c, . . . 72m and 72n of the output optical fibers 54a, 54b, 54c, . . . 54m and 54n adjacent their terminations, respectively. In yet a further embodiment, the collimator assemblies 66, 70a, 70b, 70c, . . . 70m and 70n are fixedly connected to the first surface 20 of the support plate 2 by laser welding for a high degree of mechanical rigidity and reliability to ensure accurate alignments of optical paths between the optical reflectors and the input and output optical ports.

FIG. 2 also shows the actuators 58b, 58b, 58c, 58m for mechanical switching of the movable optical reflectors 56a, 56b, 56c, . . . 56m between their on and off positions. In an embodiment, a plurality of levers 74a, 74b, 74c, . . . 74m are connected between the actuators 58a, 58b, 58c, . . . 58m and the movable optical reflectors 56a, 56b, 56c, . . . 56m, respectively to transfer mechanical movements generated by the actuators to the movable optical reflectors. In an embodiment, the actuators and the levers for switching the movable optical reflectors are located below the second surface opposite the first surface 20 of the support plate 2. In an embodiment, the actuators 58a, 58b, 58c, . . . 58m comprise conventional solenoid relay switches which are known to a person skilled in the art. Examples of mechanical assemblies for actuating the movable optical reflectors 56a, 56b, 56c, . . . 56m will be described below in reference to the sectional views of FIGS. 6 and 7.

Referring to FIG. 2, a control circuit 44 is connected to the actuators 58a, 58b, 58c, . . . 58m to supply control voltages for the actuators to generate mechanical movements. In a manner similar to the actuation of movable optical reflectors described above in reference to FIG. 1, each of the movable optical reflectors 56a, 56b, 56c, . . . 56m can be switched by the respective actuator from its on position to its off position by moving the relector toward the first surface 20 of the support plate 2 away from the first optical path 60, or from its off position to its on position by moving away from the first surface 20 of the support plate 2 to a designated location above the first surface of the support plate 2 to intercept the first optical path 60.

For example, when the movable optical reflector 56a is switched to its on position, the incident light on the first optical path 60 is reflected by its reflection surface 76, which is shown as being angled at 45° with respect to the first optical path 60, to reflect the light onto a second optical path 78 which leads to the respective output optical port 52a. Because light has the property of reciprocity, the optical port 52a can be used as an input optical port to transmit light through the respective collimator lens 64a to the movable optical reflector 56a, which when in its on position reflects the light onto the optical path 60 leading to the optical port 50.

Any one of the movable optical reflectors 56a, 56b, 56c, . . . 56m can be selected to be switched on to reflect incoming light on the first optical path 60 onto a respective second optical path leading to a respective one of the output optical fibers 54a, 54b, 54c, . . . 54m, as long as the movable optical switches preceding the selected optical switch along the first optical path 60 are in their off positions. For example, if the movable optical reflector 56b is switched to its on position while the movable optical reflector 56a which precedes the movable optical reflector 56b along the first optical path 60 is in its off position, then the output optical fiber 54b is selected to receive the light transmitted from the input optical fiber 48, regardless of whether other movable optical reflectors including the movable optical reflectors 56c and 56m, which are located subsequent to the selected movable optical reflector 56b along the first optical path 60, are in their on or off positions.

In an embodiment, only one of the movable optical reflectors 56a, 56b, 56c, . . . 56m is selected at a time by the control circuit 44 to be switched to its on position to reflect light from the primary optical port 50 to the selected secondary optical port. In an alternate embodiment, the movable optical reflectors located subsequent to the optical reflector selected for the optical switching operation can remain in their on or off positions without being switched, since they have no effect on the optical switching operation. Only the movable optical reflectors located ahead of the optical reflector along the first optical path 60 need be switched off to allow light on the first optical path to reach the selected optical reflector.

In the embodiment shown in FIG. 2, a fixed optical reflector 56n is positioned on the first surface 20 of the support plate 2 to intercept light on the first optical path 60 when all of the movable optical reflectors 56a, 56b, 56c, . . . 56m are in their off positions. The fixed optical reflector 56n is thus the default reflector for switching the light transmitted from the input optical fiber 48 to the output optical fiber 54n only if all of the movable optical reflectors 56a, 56b, 56c, . . . 56m are turned off by the control circuit 44. Alternatively, the last optical reflector 56n may also be a movable reflector switched by an additional acutator. The control circuit 44 for supplying the control voltages to the actuators 58a, 58b, 58c, . . . 58m may be implemented in a conventional manner which is apparent to a person skilled in the art.

FIG. 2 also shows a plurality of apertures 80a, 80b, 80c, . . . 80m in the support plate 2 aligned with the movable optical reflectors 56a, 56b, 56c, . . . 56m, respectively. In an embodiment, each of the movable optical reflectors is switched to its off position by moving into the respective aperture in the support plate 2. Alternatively, each of the movable optical reflectors 56a, 56b, . . . 56m may be switched to its off position by moving lower from the first optical path 60, which is above the first surface 20 of the support plate 2, to a position which is still above the first surface 20 of the support plate 2 but completely away from the first optical path 60. In yet another embodiment, the of f position of the movable optical reflector is below the second surface of the support plate 2.

Although FIG. 2 shows that a separate aperture is provided for each one of the movable optical reflectors, other aperture arrangements can also be made. For example, a plurality of elongated apertures may be provided in the support plate 2 to allow switching movements of two or more adjacent movable optical reflectors through each of the apertures. In another embodiment, all of the movable optical reflectors may be switched between their on and off positions through a single elongated aperture in the support plate 2.

Figure 3:
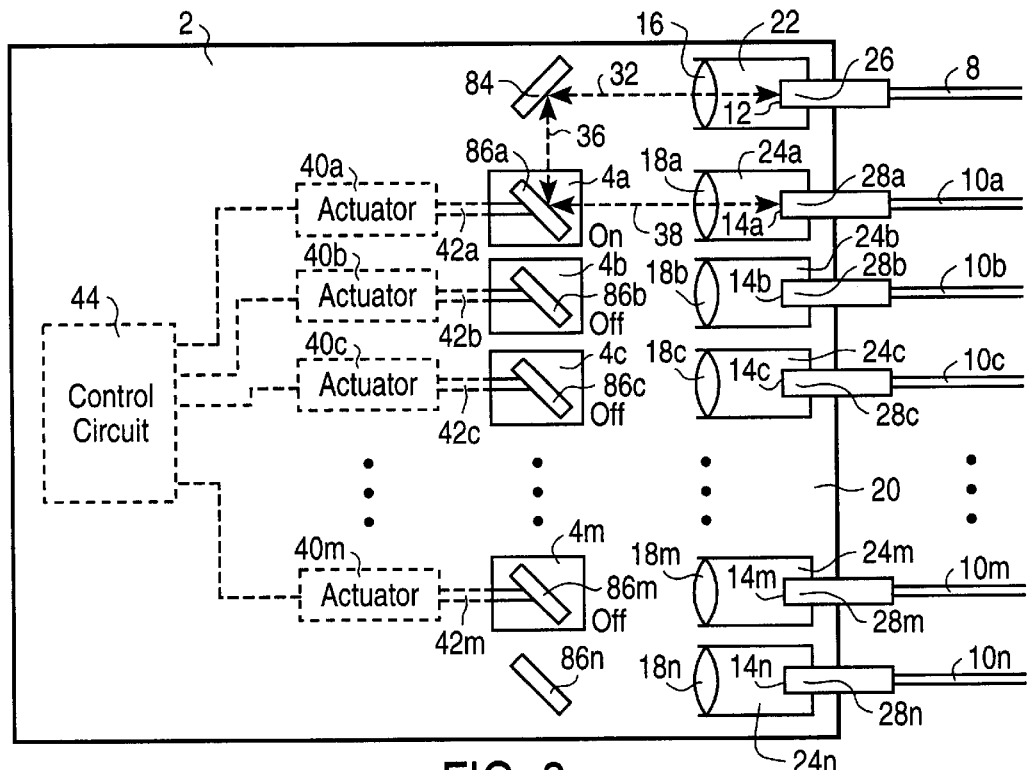
FIG. 3 shows another embodiment of the optical switch according to the present invention.

FIG. 3 shows another embodiment of the mechanically actuated optical switch according to the present invention. The embodiment shown in FIG. 3 is similar to the embodiment shown in FIG. 1 and described above, except that the prisms 30, 6a, 6b, 6c, . . . 6m and 6n in FIG. 1 are replaced by a plurality of mirrors 84, 86a, 86b, 86c, . . . 86m and 86n in FIG. 3, respectively. It is apparent to a person skilled in the art to use either prisms or mirrors as optical reflectors in a mechanically actuated optical switch, although other types of optical switching elements can also be used within the scope of the present invention. For infrared optical wavelengths in the range of about 1500 nm to about 1550 nm, which are typically used in many conventional optical fiber communications systems, prisms may provide an advantage of slightly lower insertion loss over conventional mirrors.

Figure 4:
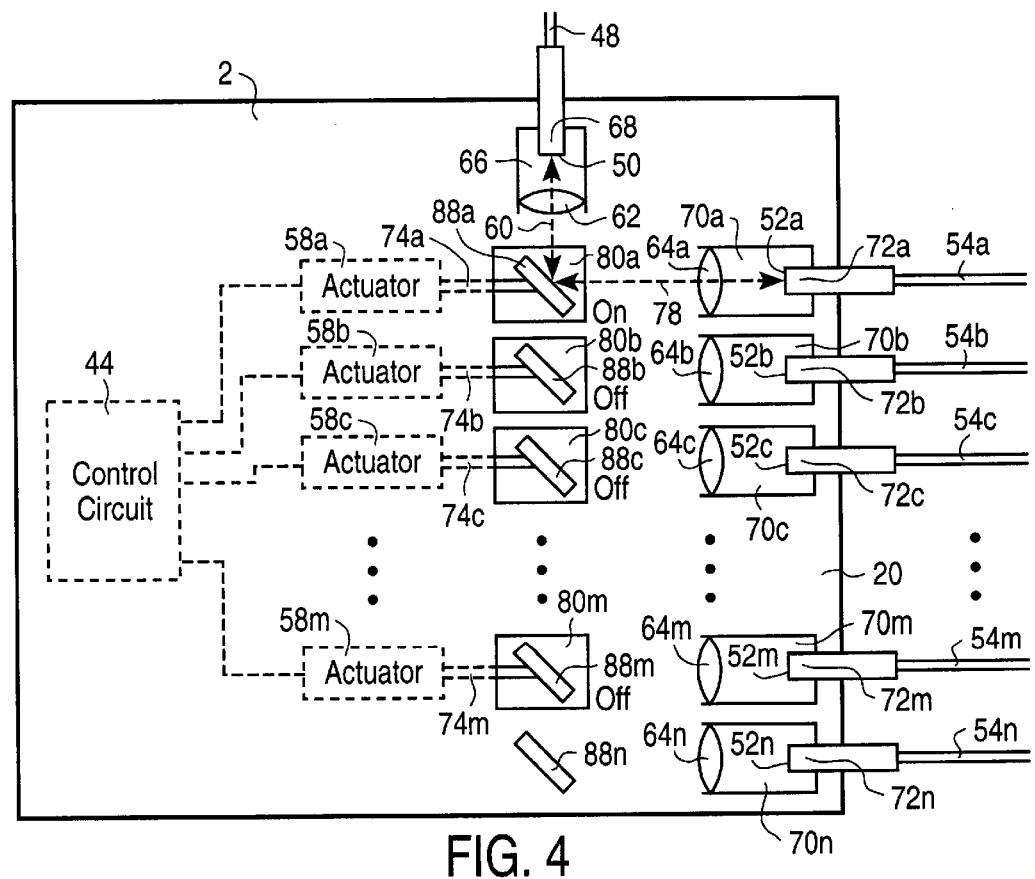
FIG. 4 shows another embodiment of the optical switch according to the present invention.

FIG. 4 shows another embodiment of the mechanically actuated optical switch according to the present invention similar to the embodiment shown in FIG. 2 and described above, except that the prisms 56a, 56b, 56c, . . . 56m and 56n as shown in FIG. 2 are replaced by a plurality of mirrors 88a, 88b, 88c, . . . 88m and 88n in FIG. 4, respectively. Whereas the reflection surface of a prism is behind the triangular prism medium and light travels through the prism medium before and after it is reflected by the reflection surface, a mirror has a reflection surface which reflects light directly in free space. Although prisms generally have lower insertion losses when used as optical reflectors at infrared wavelengths in the range of about 1500 nm to about 1550 nm, mirrors may also be used as optical reflectors in some applications.

Figure 5:
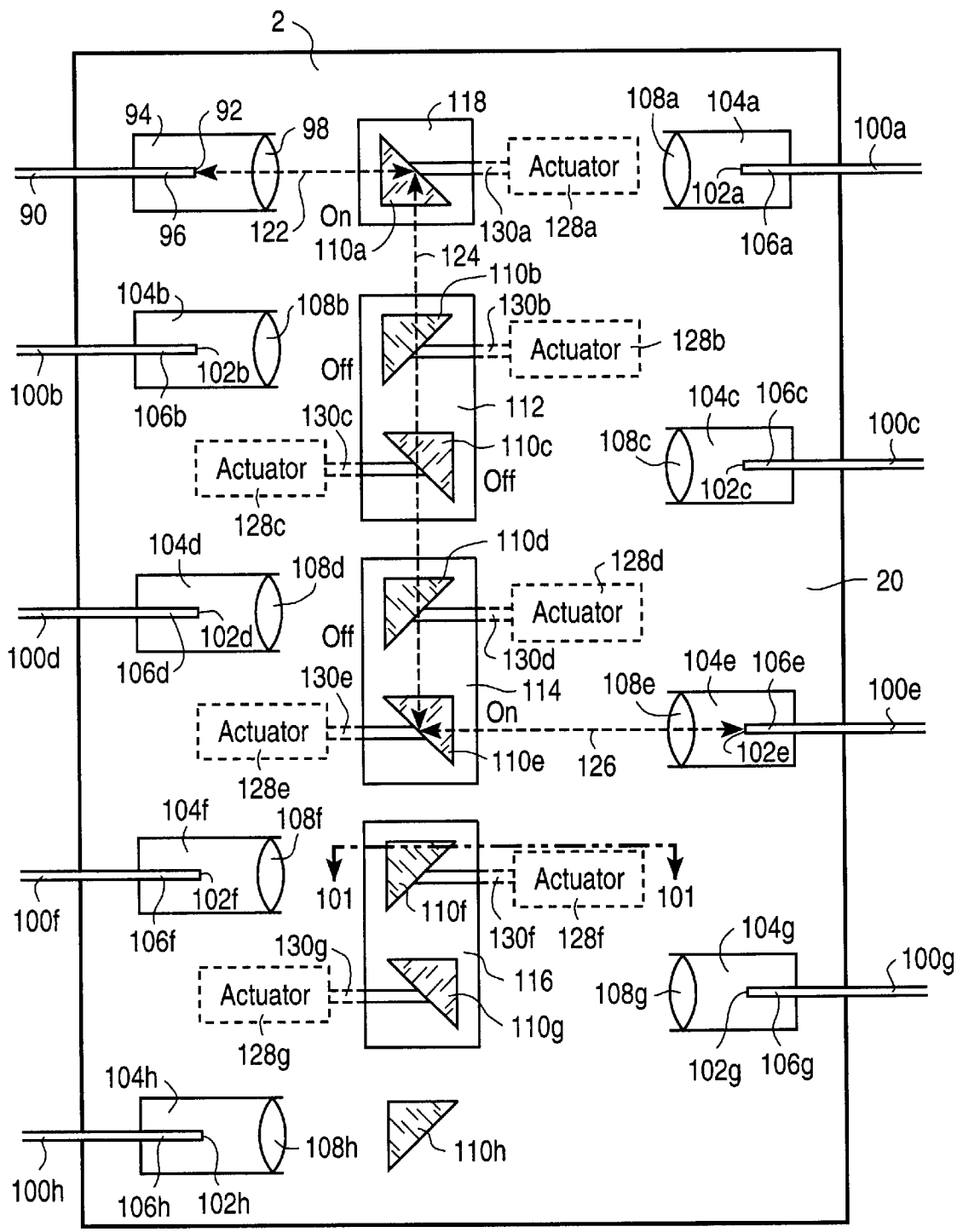
FIG. 5 shows a top plan view of yet another embodiment of the optical switch according to the present invention.

FIG. 5 shows a top plan view of yet another embodiment of the mechanically actuated optical switch according to the present invention, with parallel output optical fibers arranged for transmitting output light in opposite directions. In this embodiment, an input optical fiber 90 has a termination forming a primary optical port 92, and a first collimator assembly 94 is positioned to house an end portion 96 of the input optical fiber 90 adjacent its termination and a primary collimator lens 98, which collimates the input light from the primary optical port 92 to form a substantially parallel light beam.

A plurality of output optical fibers 100a, 10b, . . . 100h are provided for the optical switch. The output optical fibers 100b, 100d, 100f and 100h are arranged on the same side of the optical switch as the input optical fiber 90, while the output optical fibers 100a, 100c, 100e and 100g are arranged on an opposite side of the optical switch. The output optical fibers 100a, 100b, . . . 100h have terminations forming the output optical ports 102a, 102b, . . . 102h, respectively, for the optical switch.

In an embodiment, a plurality of additional collimator assemblies 104a, 104b, . . . 104h are provided for housing end portions 106a, 106b, . . . 106h of the output optical fibers 100a, 100b, . . . 100h as well as their associated collimator lenses 108a, 108b, 108h, respectively. In an embodiment, the collimator assemblies 94 and 104a, 104b, . . . 104h are connected to the first surface 20 of the support plate 2 by laser welding for mechanical rigidity and stability.

In the embodiment shown in FIG. 5, a plurality of movable optical reflectors 110a, 110b, . . . 110g and a fixed optical reflector 110h are provided. The support plate 2 has a plurality of apertures to facilitate mechanical movements of the movable optical reflectors between their on and off positions. In the embodiment shown in FIG. 5, three elongated apertures 112, 114 and 116 are provided for the movable optical reflectors 110b, 110c, . . . 110g. Each of the elongated apertures 112, 114 and 116 is positioned to allow mechanical movements of two adjacent optical reflectors. For example, the movable optical reflectors 110b and 110c share a single aperture 112 while the movable optical reflectors 110d and 110e share a single aperture 114.

A smaller aperture 118 is provided to allow mechanical movements by the first movable optical reflector 110a. The last optical reflector 110h, which is shown as a fixed reflector in this embodiment, is connected to the first surface 20 of the support plate 2 and is positioned to reflect light to the collimator assembly 104h leading to the output optical fiber 100h only if the first movable optical reflector 110a is switched on while all of the other movable optical reflectors 110b, 110c, . . . 110g are switched off.

FIG. 5 shows an example of optical paths formed between the input optical fiber 90 and the output optical fiber 100e when the movable optical reflectors 110a and 110e are in their on positions and the movable optical reflectors 110b, 110c and 110d are in their off positions. When the first movable optical reflector 110a is in its on position, light transmitted from the input optical fiber 90 on a first optical path 122 is reflected by the first movable optical reflector 110a onto a second optical path 124. If the movable optical switch 110e is in its on position while the movable optical reflectors 110b, 110c and 110d are in their off positions, light on the second optical path 124 is reflected by the movable optical reflector 110e onto a third optical path 126 which leads to the collimator assembly 104e for the output optical fiber 010e.

If, on the other hand, the movable optical reflector 110d is switched to its on position, light on the second optical path 124 is reflected by the movable optical reflector 110d to the collimator assembly 104d for the output optical fiber 110d. If the first movable optical reflector 110a is switched to its off position, light transmitted from the input optical fiber 90 travels straight to the output optical fiber 100a through the collimator lenses 98 and 108a, regardless of whether other movable optical reflectors 110b, 110c, . . . 110g are in their on or off positions.

In the embodiment shown in FIG. 5, a plurality of actuators 128a, 128b, . . . 128g are provided below the second surface of the support plate 2 for switching the respective movable optical reflectors 110a, 110b, . . . 110g between their on and off positions. A plurality of levers 130a, 130b, . . . 130g are connected between the actuators 128a, 128b, . . . 128g and the movable optical reflectors 110a, 110b, . . . 110g, respectively, to transfer mechanical movements from the actuators to the movable optical reflectors. In the embodiment shown in FIG. 5, four actuators 128a, 128b, 128d and 128f are arranged on one side of the optical reflector array while three actuators 128c, 128e and 128g are arranged on an opposite side of the reflector array to provide adequate spacing for the mechanical assemblies below the second surface of the support plate 2 and to distribute the weight of the optical switch more evenly across the support plate 2.

In a different embodiment, all of the actuators and levers below the second surface of the support plate 2 may be arranged on one side of the reflector array if spacing is not a problem. Furthermore, instead of the aperture arrangement shown in FIG. 5, a separate aperture may be provided for each of the movable optical reflectors, or alternatively, more than two movable optical reflectors may share a single elongated aperture. In yet another embodiment, only one elongated aperture is provided in the support plate 2 to allow mechanical movements of all of the movable optical reflectors 110a, 110b, . . . 110g. Although the optical reflectors 110a, 110b, 110h are shown as prisms in FIG. 5, mirrors can also be used as optical reflectors within the scope of the present invention.

Figure 6:
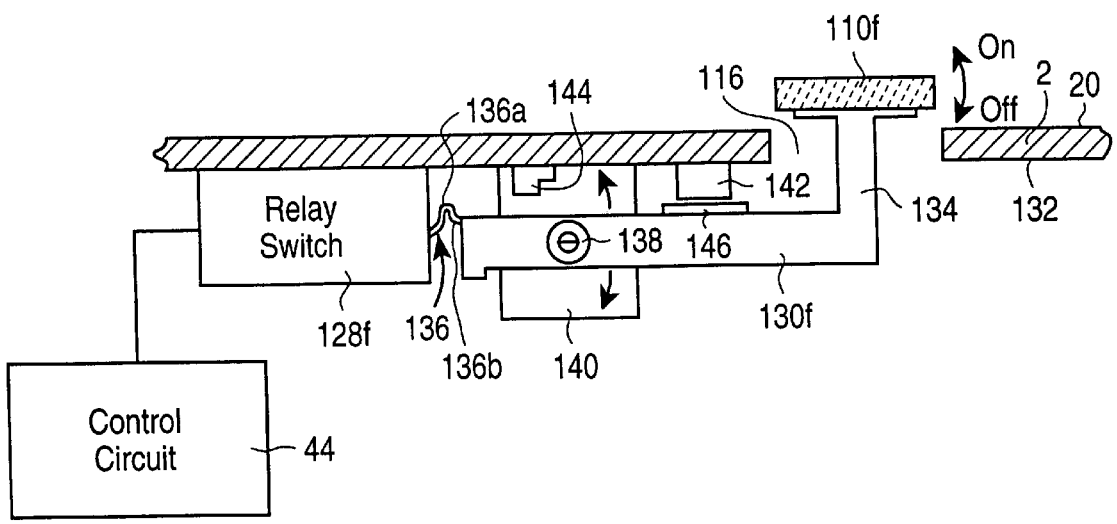
FIG. 6 shows a sectional view of an embodiment of a mechanical assembly for actuating the movable optical reflectors in the optical switch according to the present invention.

FIG. 6 shows a sectional view of an embodiment of a mechanical assembly for actuating a movable optical reflector obtained along sectional line 101—101 in FIG. 5. In this embodiment, the mechanical assembly is provided below the second surface 132 of the support plate 2 except for an end portion 134 of the lever 130f which supports the movable optical reflector 110f. The end portion 134 of the lever 130f is movable through the aperture 116 in the support plate 2 to drive the optical reflector 110f between its on and off positions. The location of the mechanical assembly below the second surface 132 of the support plate 2 avoids the blockage of optical paths above the first surface 20 of the support plate 2 and frees the first surface 20 of the support plate 2 from being cluttered with mechanical elements.

In the embodiment shown in FIG. 6, the actuator 128f comprises a conventional solenoid relay switch, which is capable of generating repetitive movements in opposite directions controlled by voltages generated by a conventional control circuit 44. The mechanical movements generated by the relay switch 128f are transferred to the lever 130f through a flexible connector 136, which in an embodiment comprises a pair of bent metal wires 136a and 136b. The lever 130f, which is pivotally supported by a stable axle assembly 138, transfers the mechanical movements generated by the relay switch 128f to the movable optical reflector 110f. As shown in FIG. 6, the axle assembly 138 is supported by a fixed member 140 which is connected to the second surface 132 of the support plate 2.

Because the movable optical reflector 110f has its designated on and off positions, two fixed blocks 142 and 144 are provided on the second surface 132 of the support plate 2 to stop further movements of the lever 130f to set the optical reflector 110f in its on and off positions. In an embodiment, a contact pad 146 is provided on the lever 130f opposite the first fixed block 142, such that when the contact pad 146 is in contact with the first fixed block 142, the optical reflector 110f is stopped in its designated on position. The second fixed block 144 is positioned to stop the lever 130f from moving farther in the opposite direction after the optical reflector 110f reaches its off position. Further details of the mechanical assembly as shown in FIG. 6 are described in U.S. patent application Ser. No. 09/416,444, titled "Actuator Assembly for Optical Switches", filed Oct. 12, 1999, which is incorporated herein by reference.

Figure 7:
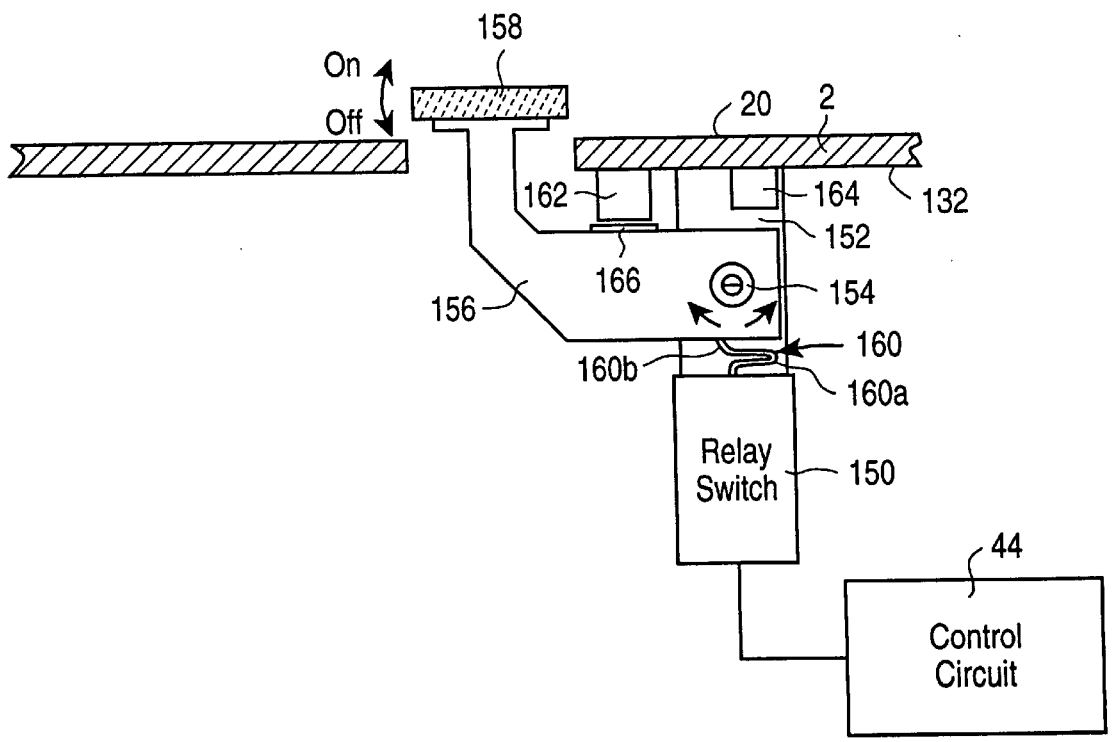
FIG. 7 shows a sectional view of another embodiment of a mechanical assembly for actuating the movable optical reflectors in the optical switch according to the present invention.

FIG. 7 shows a sectional view of another embodiment of a mechanical assembly for actuating the movable optical reflectors in the optical switch according to the present invention. In this embodiment, the actuator comprises a conventional solenoid relay switch 150, which is capable of generating repetitive mechanical movements in opposite directions controlled by voltages generated by a conventional control circuit 44. In this embodiment, the relay switch 150 is vertically mounted to a fixed member 152 which also supports a stable axle assembly 154. A lever 156 is pivotably supported by the axle assembly 154 to drive a movable optical reflector 158 between its on and off positions.

In the embodiment shown in FIG. 7, a flexible connector 160 is connected between the relay switch 150 and the lever 156 to transfer mechanical movements generated by the relay switch 150 to the lever 156. In an embodiment, the flexible connector 160 comprises two bent metal wires 160a and 160b. In FIG. 7, two fixed blocks 162 and 164 are provided on the second surface 132 of the support plate 2 to stop the lever 156 from moving farther when the movable optical reflector 158 reaches its designated on and off positions.

In an embodiment, a contact pad 166 is provided on the lever 156 opposite the first fixed block 162. When the movable optical reflector 158 reaches its designated on position, the contact pad 166 is in contact with the first fixed block 162. The second fixed block 164 stops the lever 156 from moving farther in the opposite direction when the movable optical reflector 158 reaches its off position. Further details of the mechanical assembly as shown in FIG. 7 are also described in U.S. patent application Ser. No. 09/416, 444, titled "Actuator Assembly for Optical Switches", filed Oct. 12, 1999, which is incorporated herein by reference.

Figure 8:
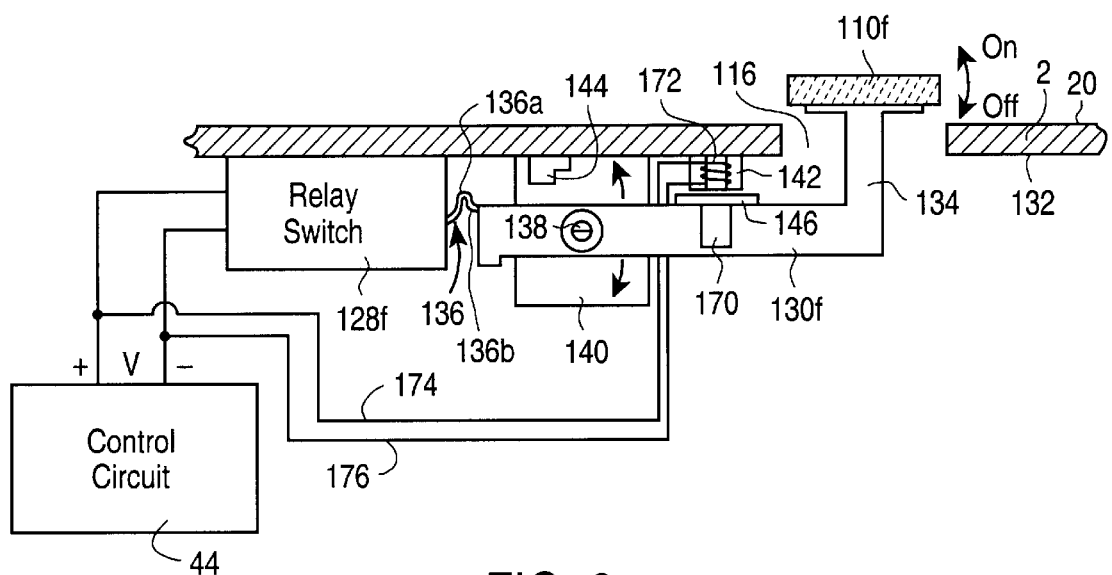
FIG. 8 shows a sectional view of another embodiment of the mechanical assembly similar to FIG. 6, with the additions of a magnet and a solenoid for faster switching of the optical switching element from its off position to its on position.
Figure 9:
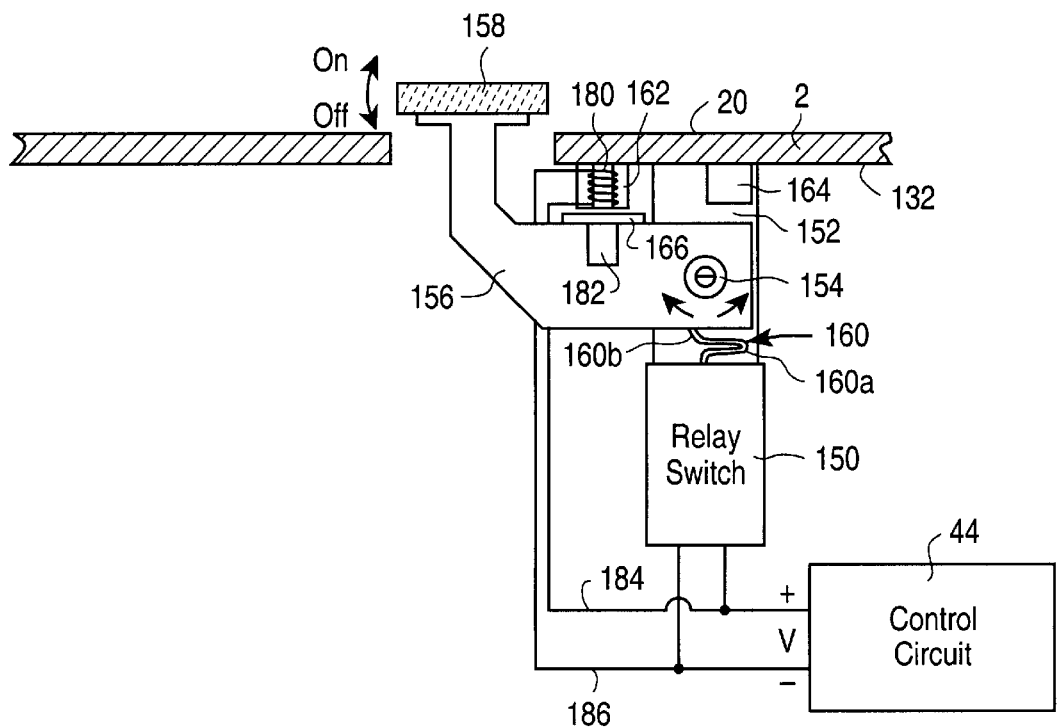
FIG. 9 shows a sectional view of another embodiment of the mechanical assembly similar to FIG. 7, with the additions of a magnet and a solenoid for faster switching of the optical switching element from its off position to its on position.

FIGS. 8 and 9 show further embodiments of mechanical assemblies for the optical switch according to the present invention. FIG. 8 shows an embodiment of the mechanical assembly similar to that which is shown in FIG. 6 and described above, with the additions of a magnet 170 which is connected to the contact pad 146 on the lever 130f and a solenoid 172 which is connected to the second surface 132 of the support plate 2. In an embodiment, the magnet 170 is a permanent magnet which generates a strong magnetic field. The solenoid 172 is connected to the second surface 132 of the support plate 2 at a position opposite the contact pad 146 and the magnet 170. In an embodiment, the solenoid 172 is positioned within the first metal block 142, which is provided with a hollow interior to house the solenoid 172.

In the embodiment shown in FIG. 8, the control circuit 44 supplies an actuating voltage V to the actuator 128f. In an embodiment, the actuator 128f generates repetitive movements in opposite directions depending upon the changes in polarities of the actuating voltage V supplied by the control circuit 44. In the embodiment shown in FIG. 8, the actuating voltage V generated by the control circuit 44 is also supplied to the solenoid 172 through conductive lines 174 and 176. When the optical switching element 110f is switched from its off position to its on position, the voltage V supplied by the control circuit 44 forces a current through the solenoid 172 to generate a magnetic field for attracting the permanent magnet 170.

Because of the magnetic force of attraction between the permanent magnet 170 and the solenoid 172 when the optical switching element 110f is moved from its off position to its on position, the switching time for the optical switching element 110f to reach its on position from its off position can be reduced compared to the embodiment shown in FIG. 6 in which the optical switching element 110f relies solely upon the force generated by the relay switch 128f to move to its on position.

Referring to FIG. 8, when the control circuit 44 reverses the polarity of the actuating voltage V to cause the relay switch 128f to move the optical switching element 110f from its on position to its off position, the polarity of the voltage supplied to the solenoid 172 is also reversed. The current through the solenoid 172 thus flows in a reverse direction to generate a reverse magnetic field to repel the permanent magnet 170 downward away from the solenoid 172. The repelling force between the solenoid 172 and the permanent magnet 170 in addition to the force generated by the relay switch 128f causes the optical switching element 110f to move quickly from its on position to its off position when the polarity of the actuating voltage V is reversed.

When the actuating voltage V is supplied to both the relay switch 128f and the solenoid 172 to move the optical switching element 110f to its on position, a strong magnetic force of attraction between the solenoid 172 and the permanent magnet 170 causes the contact pad 146 to move quickly toward the first metal block 142 in addition to the actuating force transferred from the relay switch 128f to the lever 130f through the flexible connector 136. The solenoid 172 and the permanent magnet 170 allow the switching time of the optical switching element 110f from its off position to its on position to be reduced to about 15 ms or less. After the optical switching element 110f reaches its on position, the force of attraction between the permanent magnet 170 and the solenoid 172 ensures that the contact pad 146 is in secure contact with the first metal block 142. In an embodiment, the first metal block 142 comprises a nonferrous metal such as copper or aluminum. In a further embodiment, the contact pad also comprises a nonferrous metal.

FIG. 9 shows a sectional view of an embodiment of the mechanical assembly similar to that which is shown in FIG. 7 and described above, with the additions of a permanent magnet 182 attached to the contact pad 166 and a solenoid 180 on the second surface 132 of the support plate 2. In the embodiment shown in FIG. 9, the solenoid 180 is positioned within the first metal block 162. A hollow interior may be provided in the first metal block 162 to allow sufficient space for the solenoid 180. The control circuit 44, which supplies an actuating voltage V to the relay switch 150 for generating repetitive movements in opposite directions, also supplies the same actuating voltage V to the solenoid 180 through conductive lines 184 and 186.

When the actuating voltage V is applied to the relay switch 150 to move the optical switching element 158 from its off position to its on position, it also causes a current to flow through the solenoid 180 to produce a magnetic field for attracting the permanent magnet 182. With the additional force of magnetic attraction between the permanent magnet 182 and the solenoid 180, the optical switching element 158 can be switched from its off position to its on position within a shorter switching time. When the optical switching element 158 is switched from its on position to its off position, the polarity of the actuating voltage V is reversed to cause the relay switch to generate an opposite motion. The magnetic field produced by the solenoid 180 is also reversed, thereby repelling the permanent magnet 182 downward to move the optical switching element 158 from its on position to its off position.

In an embodiment, conventional solenoids with iron cores may be implemented to attract and to repel the permanent magnets 170 and 182 as shown in FIGS. 8 and 9, respectively. In an embodiment, the contact pads 146 and 166 in FIGS. 8 and 9 may have surfaces wider than the widths of the levers 130f and 156 to allow the permanent magnets 170 and 182 to be attached to the contact pads 146 and 166 at positions external to the levers 130f and 156, respectively. In another embodiment, the permanent magnets may be positioned inside the levers, provided that the levers are made of nonferrous metals. Although the solenoids 172 and 180 are shown as being positioned inside the first metal blocks 142 and 162 in FIGS. 8 and 9, respectively, the solenoids may also be positioned outside the respective first metal blocks in a different embodiment, as long as the solenoids are able to produce sufficiently strong forces of attraction and repulsion on the respective permanent magnets.

The invention has been described with respect to particular embodiments thereof, and numerous modifications can be made which are within the scope of the invention as set forth in the claims.

What is claimed is:

1. An optical switch, comprising:
   (a) a primary optical port;
   (b) a plurality of secondary optical ports;
   (c) a support plate having first and second surfaces opposite each other;
   (d) a primary reflector positioned on the first surface of the support plate to receive incoming light on a first optical path from the primary optical port, the primary reflector having a reflection surface angled with respect to the first optical path to reflect the light onto a second optical path;
   (e) a plurality of secondary reflectors movable with respect to the support plate, each of the secondary reflectors capable of occupying an on position to intercept the light on the second optical path or an off position away from the second optical path, each of the secondary reflectors having a reflection surface angled with respect to the second optical path when the secondary reflector is in the on position to reflect the light onto a respective third optical path leading to a respective one of the secondary optical ports,
   wherein each of the secondary reflectors is capable of being switched from the on position to the off position by moving the secondary reflector toward the support plate away from the second optical path, and
   wherein each of the secondary reflectors is capable of being switched from the off position to the on position by moving the secondary reflector away from the support plate onto the second optical path; and
   (f) a plurality of actuators disposed on the support plate, the actuators connected to the secondary reflectors respectively to drive the secondary reflectors between their on and off positions.

2. The optical switch of claim 1, wherein the actuators comprise relay switches.

3. The optical switch of claim 1, wherein the actuators are disposed on the second surface of the support plate, and wherein the support plate comprises a perforated plate having at least one aperture through the first and second surfaces of the support plate to allow transfers of mechanical movements from the actuators to the secondary reflectors.

4. The optical switch of claim 3, wherein the perforated plate has a plurality of apertures aligned respectively with the secondary reflectors, further comprising a plurality of levers connected between the actuators and the secondary reflectors, each of the levers movably positioned through a respective one of the apertures to drive a respective one of the secondary reflectors.

5. The optical switch of claim 1, wherein only one of the actuators is selected at a time to drive a respective one of the secondary reflectors to its on position to reflect the light from the second optical path onto the respective third optical path leading to the respective secondary optical port which is selected for outputting the light.

6. The optical switch of claim 1, wherein any one of the secondary reflectors is capable of being selected at a time to be in its on position to reflect light incoming from the respective secondary optical port onto the second optical path while other secondary reflectors are in their off positions, and wherein the primary reflector is positioned to reflect the light from the selected secondary reflector onto the first optical path.

7. The optical switch of claim 1, wherein the primary and secondary reflectors comprise mirrors.

8. The optical switch of claim 1, wherein the primary and secondary reflectors comprise prisms.

9. The optical switch of claim 1, wherein the reflection surface of the primary reflector is angled at 45° with respect to the first optical path, wherein the reflection surface of each of the secondary reflectors is angled at 45° with respect to the second optical path, and wherein the third optical path is parallel to the first optical path.

10. The optical switch of claim 1, further comprising:
(g) an input optical fiber having a termination forming the primary optical port; and
(h) a plurality of output optical fibers having terminations forming the secondary optical ports respectively.

11. The optical switch of claim 10, further comprising:
(i) a primary lens positioned between the primary optical port and the primary reflector to collimate the incoming light on the first optical path; and
(j) a plurality of secondary lenses each positioned between a respective one of the secondary reflectors and the respective secondary optical port to collimate light on the respective third optical path.

12. The optical switch of claim 11, further comprising:
(k) a first collimator assembly on the first surface of the support plate to house the primary lens and at least a portion of the input optical fiber adjacent its termination, the first collimator assembly fixedly connected to the first surface of the support plate by laser welding; and
(l) a plurality of additional collimator assemblies on the first surface of the support plate each positioned to house a respective one of the secondary lenses and at least a portion of a respective one of the output optical fibers adjacent its termination, the additional collimator assemblies fixedly connected to the first surface of the support plate by laser welding.

13. The optical switch of claim 1, wherein the primary reflector is movable with respect to the support plate, the primary reflector capable of occupying an on position to intercept the light on the first optical path or an off position away from the first optical path, the primary reflector having a reflection surface angled with respect to the first optical path when the primary reflector is in the on position to reflect the light onto the second optical path.

14. The optical switch of claim 13, further comprising a additional actuator disposed on the second surface of the support plate, the additional actuator connected to the primary reflector through an aperture in the support plate to drive the primary reflector between its on and off positions.

15. The optical switch of claim 1, wherein the primary reflector is fixedly positioned on the first surface of the support plate, further comprising:
(g) a tertiary reflector fixedly positioned on the first surface of the support plate to intercept the light on the second optical path when all of the secondary reflectors are in their off positions; and
(h) a tertiary optical port positioned to receive the light reflected from the tertiary reflector when all of the secondary reflectors are in their off positions.

16. The optical switch of claim 15, further comprising a tertiary lens positioned between the tertiary reflector and the tertiary optical port.

17. A 1×N optical switch having an optical input and N optical outputs, wherein N is an integer greater than 1, the optical switch comprising:
(a) a support plate having first and second surfaces opposite each other, the support plate having N apertures arranged in a row perforating the first and second surfaces;
(b) a primary reflector fixedly positioned on the first surface of the support plate to receive incoming light on a first optical path from the optical input, the primary reflector having a reflection surface angled with respect to the first optical path to reflect the light onto a second optical path;
(c) N secondary reflectors movable with respect to the support plate, each of the secondary reflectors capable of occupying an on position to intercept the light on the second optical path or an off position away from the second optical path, each of the secondary reflectors having a reflection surface angled with respect to the second optical path when the secondary reflector is in the on position to reflect the light onto a respective third optical path leading to a respective one of the optical outputs, the secondary reflectors aligned with the apertures in the support plate,
wherein each of the secondary reflectors is capable of being switched from the on position to the off position by moving the secondary reflector toward a respective one of the apertures away from the second optical path, and
wherein each of the secondary reflectors is capable of being switched from the off position to the on position by moving the secondary reflector away from the respective aperture onto the second optical path; and
(d) N actuators disposed on the second surface of the support plate, the actuators connected to the secondary ref lectors respectively through the apertures in the support plate to drive the secondary reflectors between their on and off positions.

18. The optical switch of claim 17, wherein the actuators comprise relay switches.

19. The optical switch of claim 17, further comprising N levers connected between the actuators and the secondary reflectors respectively, each of the levers movably positioned through a respective one of the apertures to drive a respective one of the secondary reflectors.

20. The optical switch of claim 17, wherein only one of the actuators is selected at a time to drive a respective one of the secondary reflectors to its on position to reflect the light from the second optical path onto the respective third optical path leading to the respective optical output which is selected for outputting the light.

21. The optical switch of claim 17, wherein any one of the secondary reflectors is capable of being selected at a time to be in its on position to reflect light incoming from the respective optical output onto the second optical path while other secondary reflectors are in their of f positions, and wherein the primary reflector is positioned to reflect the light from the selected secondary reflector onto the first optical path.

22. The optical switch of claim 17, further comprising a primary lens positioned on the first optical path to collimate the incoming light from the optical input.

23. The optical switch of claim 22, further comprising N secondary lenses each positioned to collimate light reflected from a respective one of the secondary reflectors on the respective third optical path.

24. The optical switch of claim 17, wherein the primary and secondary reflectors comprise mirrors.

25. The optical switch of claim 17, wherein the primary and secondary reflectors comprise prisms.

26. The optical switch of claim 17, wherein the reflection surface of the primary reflector is angled at 45° with respect to the first optical path, wherein the reflection surface of each of the secondary reflectors is angled at 45° with respect to the second optical path, and wherein the third optical path is parallel to the first optical path.

27. An optical switch, comprising:
 (a) a primary optical port;
 (b) a plurality of secondary optical ports;
 (c) a perforated support plate having first and second surfaces opposite each other, the perforated support plate having at least one aperture;
 (d) a primary reflector positioned on the first surface of the support plate to receive incoming light on a first optical path from the primary optical port, the primary reflector having a reflection surface angled with respect to the first optical path to reflect the light onto a second optical path;
 (e) a plurality of secondary reflectors movable with respect to the support plate, each of the secondary reflectors capable of occupying an on position to intercept the light on the second optical path or an off position away from the second optical path, each of the secondary reflectors having a reflection surface angled with respect to the second optical path when the secondary reflector is in the on position to reflect the light onto a respective third optical path leading to a respective one of the secondary optical ports,
  wherein each of the secondary reflectors is capable of being switched from the on position to the off position by moving the secondary reflector toward the aperture away from the second optical path, and wherein each of the secondary reflectors is capable of being switched from the off position to the on position by moving the secondary reflector away from the aperture onto the second optical path;
 (f) means for switching the secondary reflectors between their on and off positions;
 (g) a primary lens positioned between the primary optical port and the primary reflector to collimate the incoming light on the first optical path; and
 (h) a plurality of secondary lenses each positioned between a respective one of the secondary reflectors and the respective secondary optical port to collimate light on the respective third optical path.

28. The optical switch of claim 27, wherein the means for switching the secondary reflectors comprise a plurality of relay switches connected to the second surface of the support plate.

29. The optical switch of claim 27, wherein the means for switching the secondary reflectors comprise a plurality of actuators disposed on the second surface of the support plate.

30. The optical switch of claim 29, wherein the means for switching the secondary reflectors further comprise a plurality of levers connected between the actuators and the secondary reflectors, each of the levers movably positioned through the aperture to drive a respective one of the secondary reflectors.

31. The optical switch of claim 29, wherein only one of the actuators is selected at a time to drive a respective one of the secondary reflectors to its on position to reflect the light from the second optical path onto the respective third optical path leading to the respective secondary optical port which is selected for outputting the light.

32. The optical switch of claim 27, wherein any one of the secondary reflectors is capable of being selected at a time to be in its on position to reflect light incoming from the respective secondary optical port onto the second optical path while other secondary reflectors are in their off positions, and wherein the primary reflector is positioned to reflect the light from the selected secondary reflector onto the first 8 optical path.

33. The optical switch of claim 27, wherein the primary and secondary reflectors comprise mirrors.

34. The optical switch of claim 27, wherein the primary and secondary reflectors comprise prisms.

35. The optical switch of claim 27, wherein the primary reflector is angled at 45° with respect to the first optical path, wherein the reflection surface of each of the secondary reflectors is angled at 45° with respect to the second optical path, and wherein the third optical path is parallel to the first optical path.

36. The optical switch of claim 27, further comprising:
 (i) an input optical fiber connected to the primary optical port; and
 (j) a plurality of output optical fibers connected to the secondary optical ports.

37. An optical switch, comprising:
 (a) a primary optical port;
 (b) a plurality of secondary optical ports;
 (c) a support plate having first and second surfaces opposite each other;
 (d) a plurality of optical reflectors movable with respect to the support plate, each of the optical reflectors capable of occupying an on position to intercept incoming light on a first optical path from the primary optical port or an off position away from the first optical path, each of the optical reflectors having a reflection surface angled with respect to the first optical path when the optical reflector is in the on position to reflect the light onto a respective second optical path leading to a respective one of the secondary optical ports,
  wherein each of the optical reflectors is capable of being switched from the on position to the off position by moving the optical reflector toward the support plate away from the first optical path, and wherein each of the optical reflectors is capable of being switched from the off position to the on position by moving the optical reflector away from the support plate onto the first optical path; and
 (e) a plurality of actuators disposed on the second surface of the support plate, the actuators connected to the optical reflectors respectively to drive the optical reflectors between their on and off positions.

38. The optical switch of claim 37, wherein the actuators comprise relay switches.

39. The optical switch of claim 37, wherein the support plate comprises a perforated plate having at least one aperture through the first and second surfaces of the support plate, further comprising a plurality of levers connected between the actuators and the optical reflectors, each of the levers movably positioned through the aperture to drive a respective one of the optical reflectors.

40. The optical switch of claim 37, wherein only one of the actuators is selected at a time to drive a respective one of the optical reflectors to its on position to reflect the light from the first optical path onto the respective second optical path leading to the respective secondary optical port which is selected for outputting the light.

41. The optical switch of claim 37, wherein the optical reflectors comprise mirrors.

42. The optical switch of claim 37, wherein the optical reflectors comprise prisms.

43. The optical switch of claim 37, wherein each of the optical reflectors is angled at 45° with respect to the first optical path, and wherein the second optical path is perpendicular to the first optical path.

44. The optical switch of claim 37, further comprising:
(f) an input optical fiber having a termination forming the primary optical port; and
(g) a plurality of output optical fibers having terminations forming the secondary optical ports respectively.

45. The optical switch of claim 44, further comprising:
(h) a primary lens positioned adjacent the primary optical port to collimate the light on the first optical path; and
(i) a plurality of secondary lenses each positioned adjacent a respective one of the secondary optical ports to collimate light on the respective second optical path.

46. The optical switch of claim 45, further comprising:
(j) a first collimator assembly on the first surface of the support plate to house the primary lens and at least a portion of the input optical fiber adjacent its termination, the first collimator assembly fixedly connected to the first surface of the support plate by laser welding; and
(k) a plurality of additional collimator assemblies on the first surface of the support plate each positioned to house a respective one of the secondary lenses and at least a portion of a respective one of the output optical fibers adjacent its termination, the additional collimator assemblies fixedly connected to the first surface of the support plate by laser welding.

47. The optical switch of claim 37, further comprising:
(f) an additional optical reflector fixedly positioned on the first surface of the support plate, the additional optical reflector positioned to intercept the light on the first optical path when all of the optical reflectors which are movable with respect to the support plate are in their off positions; and
(g) an additional optical port positioned to receive the light reflected from the additional optical reflector when all of the optical reflectors which are movable with respect to the support plate are in their off positions.

48. The optical switch of claim 47, further comprising an additional lens positioned between the additional optical reflector and the additional optical port.

49. A 1×N optical switch having an optical input and N optical outputs, wherein N is an integer greater than 1, the optical switch comprising:
(a) a support plate having first and second surfaces opposite each other, the support plate having N apertures arranged in a row perforating the first and second surfaces;
(b) N optical reflectors aligned with the apertures in the support plate and movable with respect to the support plate, each of the optical reflectors capable of occupying an on position to intercept incoming light on a first optical path from the optical input or an off position away from the first optical path, each of the optical reflectors having a reflection surface angled with respect to the first optical path when the optical reflector is in the on position to reflect the light onto a respective second optical path leading to a respective one of the optical outputs,
wherein each of the optical reflectors is capable of being switched from the on position to the off position by moving the optical reflector toward a respective one of the apertures away from the first optical path, and
wherein each of the optical reflectors is capable of being switched from the off position to the on position by moving the optical reflector away from the respective aperture onto the first optical path;
(c) a plurality of actuators disposed on the second surface of the support plate, the actuators connected to the optical reflectors respectively through the apertures in the support plate to drive the optical reflectors between their on and off positions;
(d) a primary lens positioned adjacent the optical input to collimate the light on the first optical path; and
(e) a plurality of secondary lenses each positioned adjacent a respective one of the optical outputs to collimate the light on the respective second optical path.

50. The optical switch of claim 49, wherein the actuators comprise relay switches.

51. The optical switch of claim 49, further comprising a plurality of levers connected between the actuators and the optical reflectors, each of the levers movably positioned through a respective one of the apertures to drive a respective one of the optical reflectors.

52. The optical switch of claim 49, wherein only one of the actuators is selected at a time to drive a respective one of the optical reflectors to its on position to reflect the light from the first optical path onto the respective second optical path leading to the respective optical output which is selected for outputting the light.

53. The optical switch of claim 49, wherein the optical reflectors comprise mirrors.

54. The optical switch of claim 49, wherein the optical reflectors comprise prisms.

55. The optical switch of claim 49, wherein each of the optical reflectors is angled at 45° with respect to the first optical path, and wherein the second optical path is perpendicular to the first optical path.

56. An optical switch, comprising:
(a) a primary optical port;
(b) at least two secondary optical ports;
(c) a support plate having first and second surfaces opposite each other;
(d) at least one movable optical reflector movable with respect to the support plate, the movable optical reflector capable of occupying an on position to intercept light received from the primary optical port on a first optical path or an off position away from the first optical path, the movable optical reflector having a reflection surface angled with respect to the first optical path when the movable optical reflector is in the on position to reflect the light onto a second optical path leading to one of the secondary optical ports,
wherein the movable optical reflector is capable of being switched from the on position to the off position by moving toward the support plate away from the first optical path, and
wherein the movable optical reflector is capable of being switched from the off position to the on position by moving away from the support plate onto the first optical path;

(e) at least one actuator disposed on the second surface of the support plate, the actuator connected to drive the movable optical reflector between its on and off positions; and (f) a fixed optical reflector, connected to the first surface of the support plate, positioned to reflect the light on the first optical path to another one of the secondary optical ports when the movable optical reflector is in its off position.

57. The optical switch of claim 56, wherein the actuator comprises a relay switch.

58. The optical switch of claim 56, wherein the support plate comprises a perforated plate having at least one aperture through the first and second surfaces of the support plate, further comprising at least one lever connected between the actuator and the movable optical reflector, the lever movably positioned through the aperture to drive the movable optical reflector.

59. The optical switch of claim 56, wherein the movable and fixed optical reflectors comprise mirrors.

60. The optical switch of claim 56, wherein the movable and fixed optical reflectors comprise prisms.

61. The optical switch of claim 56, wherein each of the movable and fixed optical reflectors is angled at 45° with respect to the first optical path, and wherein the second optical path is perpendicular to the first optical path.

62. The optical switch of claim 56, further comprising:

(g) an input optical fiber having a termination forming the primary optical port; and (h) a plurality of output optical fibers having terminations forming the secondary optical ports respectively.

63. The optical switch of claim 62, further comprising:

(i) a primary lens positioned adjacent the primary optical port; and (j) a plurality of secondary lenses each positioned adjacent a respective one of the secondary optical ports.

64. The optical switch of claim 63, further comprising:

(k) a first collimator assembly on the first surface of the support plate to house the primary lens and at least a portion of the input optical fiber adjacent its termination, the first collimator assembly fixedly connected to the first surface of the support plate by laser welding; and (l) a plurality of additional collimator assemblies on the first surface of the support plate each positioned to house a respective one of the secondary lenses and at least a portion of a respective one of the output optical fibers adjacent its termination, the additional collimator assemblies fixedly connected to the first surface of the support plate by laser welding.

65. The optical switch of claim 56, further comprising an additional optical reflector fixedly positioned on the first surface of the support plate, the additional optical reflector positioned to reflect light from the primary optical port onto the first optical path.

66. The optical switch of claim 56, further comprising:

(g) a tertiary optical port; and (h) an additional movable optical reflector movable with respect to the support plate, the additional movable optical reflector capable of occupying an on position to reflect light from the primary optical port onto the first optical path, or an off position to allow the light to be transmitted from the primary optical port straight to the tertiary optical port.

* * * * *